United States Patent Office 2,697,391
Patented Dec. 21, 1954

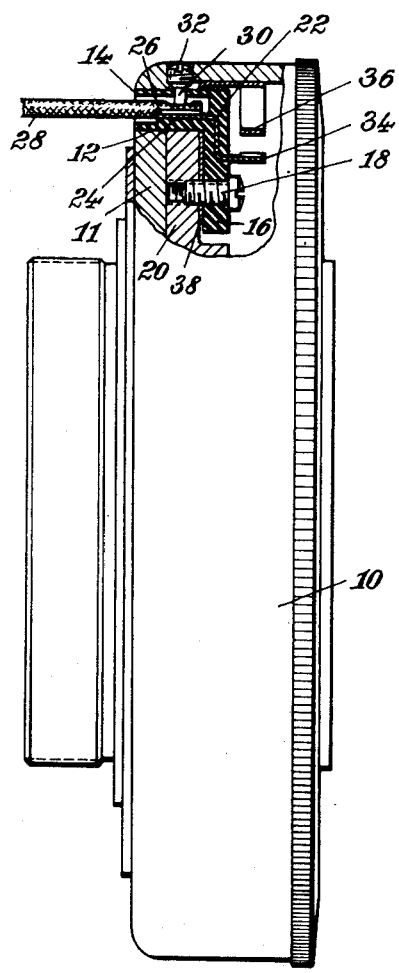

2,697,391

CAMERA SHUTTER WITH BUILT-IN CONTACT DEVICE FOR FLASHLIGHT CIRCUITS

Kurt Gebele, Munich, Germany, assignor to Hans Deckel, Munich-Solln, and Friedrich Wilhelm Deckel, Tutzing, Germany Application April 20, 1951, Serial No. 221,959

2 Claims. (Cl. 95—11.5)

This invention relates to lens shutters with built-in contact devices for flashlight circuits. In a lens shutter of this kind the coupling device for the connecting leads is frequently arranged on the circumference of the shutter casing. In a camera with recessed arrangement of the shutter, however, such an arrangement is impracticable, since a laterally-projecting coupling element cannot be accommodated for lack of space.

An object of the invention is to provide a form of connection which shall be applicable also in such cases and which can be coupled in a simple manner to the leads of the electrical equipment attached to or incorporated in the camera.

To the attainment of this object and in accordance with the invention the connecting cable for the electrical equipment is led through the rear wall of the shutter casing and retained by a gripping or clamping device accessible from outside the shutter. It is advantageous to grip the connecting cable inside the shutter casing in an insulating element carrying a countercontact element, such gripping device being preferably fitted on the circumference of the shutter casing consisting of a slotted screw and clamping bolt made of insulating material. It is also advantageous to attach the insulating element inside the shutter casing in such manner that a hollow projection of this insulating element projects through the rear wall of the shutter casing and encloses the end of the connecting cable. The countercontact element can be cast into the insulating element and simultaneously form a part of the contact device for the flashlight circuit, while the second member of the contact device is retained by the means of attachment of the insulating element.

The accompanying drawing shows an example of an arrangement in accordance with the invention.

The camera lens shutter casing 10 shown in the drawing includes a cylindrical outside portion and a rear wall portion 11 and has in its rear wall an opening 12 through which projects a hollow bush 14 forming part of a flat insulating plate 16. The insulator 16 is attached by a screw 18 inside the shutter casing to a plate 20 and carries a cast-in countercontact element 22. A lug 24 on this element 22 is exposed and projects into the bore of the bush 14, where it forms a bearing for the correspondingly exposed or bared conductor strand 26 of a connecting cable 28 which is passed into the bush 14 of the insulator 16 and secured by means of an insulating pin 30 and a slotted screw 32 arranged on the circumference of the shutter casing.

An arched lug 34 of the countercontact element 22 projects freely out of the insulator 16 into the interior of the shutter casing and forms there one part of the contact device for the flashlight circuit. The other part of the aforesaid contact device is formed by the spring blade 36 of a contact washer 38 inserted between the insulator 16 and the plate 20 and there retained by the screw 18. This contact washer 38 is conductively connected through the body of the shutter casing 10 (or the camera) with the flashlight equipment.

During release of the shutter a separate device not shown presses the contact blade 36 against the contact lug 34 and thereby closes the flashlight circuit.

The described arrangement has the particular advantage that it requires no additional space outside the shutter and thus makes possible a recessed arrangement of the latter. Furthermore, the connecting cable may be coupled to the connecting elements when the shutter is fitted in the camera without disturbing such fitting or requiring the shutter casing to be subsequently opened.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. In a camera lens shutter the combination with a shutter casing including a transversely extending plate member, a flat insulating plate carried by the aforesaid plate member adjacent the peripheral edge thereof, the rear wall of said shutter casing being apertured adjacent the peripheral edge of said transversely extending plate member, a bush carried by said flat insulating plate and extending in a direction normal to the plane thereof beyond the peripheral edge of said plate member and through the apertured rear wall of said shutter casing, a countercontact element embedded in said flat insulating plate and terminating interiorly of said bush, a coacting contact element clamped between said flat insulating plate and said transversely extending wall and aligned with the aforesaid countercontact element, and a securing screw extending through said shutter casing and through said bush and operative to adjustably engage the end of the electrical conductor inserted through said bush for maintaining said electrical conductor in electrical connection with the terminating end of said countercontact element whereby an electrical circuit may be instantaneously established between said countercontact element and said coacting contact element.

2. In a camera lens shutter, the combination with a shutter casing having a rear wall apertured adjacent the periphery thereof, a transversely disposed plate member adjacent said rear wall having a peripheral portion aligned with the apertured periphery of said rear wall, a flat insulating plate, means securing said flat insulating plate to said plate member adjacent the periphery of said plate member and the apertured rear wall, said flat insulating plate having a bush projecting therefrom beyond said transversely extending plate member and through said apertured rear wall, a contact element having a central portion contiguous with said flat insulating plate and end portions extending substantially normal thereto in opposite directions, one of said end portions extending into said bush and the other of said end portions projecting beyond said flat insulating plate and carrying a contact thereon, a coacting contact member secured between said plate member and said flat insulating plate and aligned with the aforesaid contact, and means extending through said shutter casing and through said bush for clamping an electrical conductor in electrical engagement with the end portion of said first mentioned contact element that extends into said bush.

References Cited in the file of this patent

UNITED STATES PATENTS

| Number | Name | Date |
|---|---|---|
| 2,229,816 | Nicastro | Jan. 28, 1941 |
| 2,362,863 | Sprague et al. | Nov. 14, 1944 |
| 2,365,847 | Steiner | Dec. 26, 1944 |
| 2,365,899 | Nadel | Dec. 26, 1944 |
| 2,517,407 | Nilsen | Aug. 1, 1950 |
| 2,567,627 | Van Bibber | Sept. 11, 1951 |
| 2,587,436 | Bolsey | Feb. 26, 1952 |

FOREIGN PATENTS

| Number | Country | Date |
|---|---|---|
| 724,336 | Germany | Aug. 24, 1942 |